United States Patent [19]
Lotan

[11] Patent Number: 5,123,241
[45] Date of Patent: Jun. 23, 1992

[54] SYSTEM FOR DEFORMING A TURBINE STATOR HOUSING

[75] Inventor: Dan Lotan, Paris, France

[73] Assignee: Societe Nationale d'Etude et de Construction de Moteurs d'Aviation ("S.N.E.C.M.A."), Paris, France

[21] Appl. No.: 597,353

[22] Filed: Oct. 10, 1990

[30] Foreign Application Priority Data

Oct. 11, 1989 [FR] France ............... 89 13256

[51] Int. Cl.⁵ ............................................. F02C 3/00
[52] U.S. Cl. ..................... 60/39.75; 415/195; 415/117; 415/178
[58] Field of Search ............... 60/39.75; 415/191, 194, 415/195, 116, 117, 178

[56] References Cited

U.S. PATENT DOCUMENTS

| | | |
|---|---|---|
| 1,537,175 | 5/1925 | Losel . |
| 3,169,747 | 2/1965 | Seymour ............... 415/195 |
| 3,742,705 | 7/1973 | Sifford ............... 60/39.75 |
| 4,222,708 | 9/1980 | Davison . |
| 4,230,439 | 10/1980 | Smith, Jr. et al. . |
| 4,304,093 | 12/1981 | Schulze . |
| 4,332,133 | 6/1982 | Schwarz et al. ............... 60/39.75 |
| 4,429,044 | 12/1983 | Barry et al. . |
| 4,525,998 | 7/1985 | Schwarz ............... 415/178 |
| 4,548,546 | 10/1985 | Lardellier . |
| 4,696,157 | 9/1987 | Barbier et al. ............... 60/39.23 |
| 4,720,970 | 1/1988 | Hudson et al. ............... 60/39.36 |
| 4,805,398 | 2/1989 | Jourdain et al. ............... 60/39.75 |
| 4,856,272 | 8/1989 | Putnam et al. ............... 415/178 |
| 5,048,288 | 9/1991 | Bessette et al. ............... 60/39.75 |

FOREIGN PATENT DOCUMENTS

| | | |
|---|---|---|
| 518932 | 2/1931 | Fed. Rep. of Germany . |
| 0768037 | 4/1955 | Fed. Rep. of Germany ...... 415/195 |
| 429767 | 8/1967 | Fed. Rep. of Germany . |
| 98728 | 6/1972 | Fed. Rep. of Germany . |
| 2587411 | 9/1986 | France . |
| 1581566 | 12/1980 | United Kingdom . |
| 1581855 | 12/1980 | United Kingdom . |
| 2103718 | 2/1983 | United Kingdom . |
| 2114661 | 8/1983 | United Kingdom . |
| 2117842 | 10/1983 | United Kingdom . |
| 2195715 | 4/1988 | United Kingdom . |

*Primary Examiner*—Richard A. Bertsch
*Assistant Examiner*—Michael I. Kocharov
*Attorney, Agent, or Firm*—Bacon & Thomas

[57] ABSTRACT

A system for deforming a turbine stator housing is disclosed which maintains a substantially uniform radial clearance between a stator and a rotor under all operating conditions of a turbojet engine. The system deforms the turbine stator housing so that its longitudinal axis is substantially conincident with the longitudinal axis of the rotor, particularly under transient conditions. Such deformation results in the attainment of equal radial clearance between the rotor and the stator around the periphery of the rotor. The deformation is achieved by heating or cooling a selected portion of the stator housing such that the temperature distribution, measured around a periphery of the stator housing, is non-uniform, such non-uniform temperature distribution causing the stator to radially deform such that is longitudinal axis is coincident with that of the rotor.

15 Claims, 3 Drawing Sheets

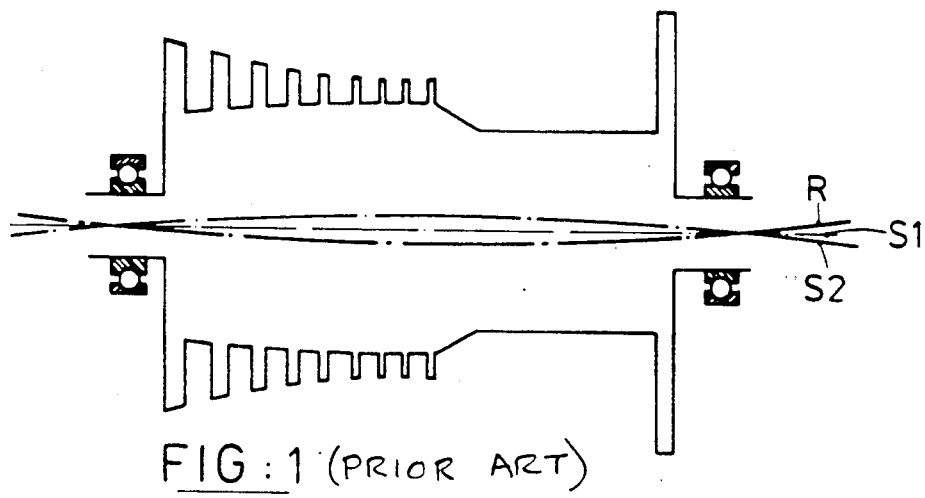
FIG:1 (PRIOR ART)
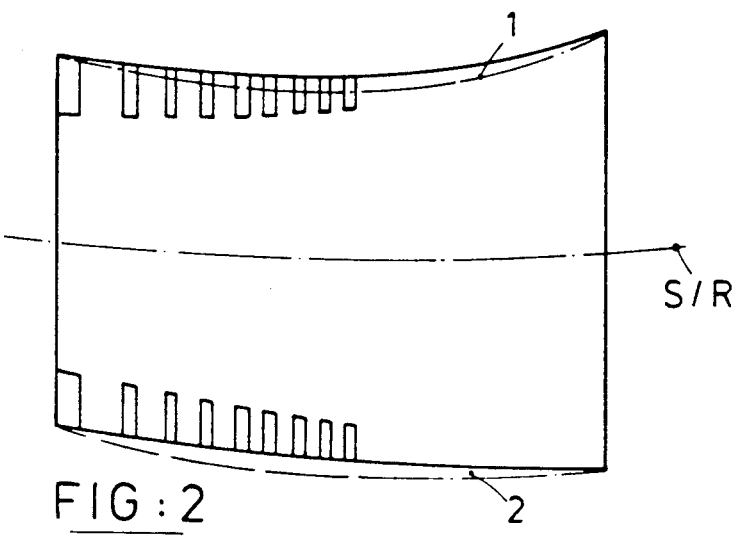
FIG:2
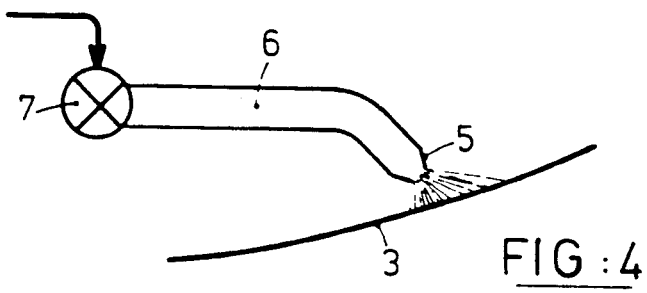
FIG:4
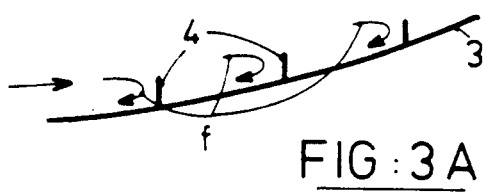
FIG:3A
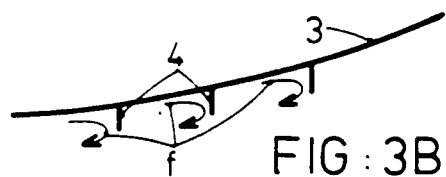
FIG:3B

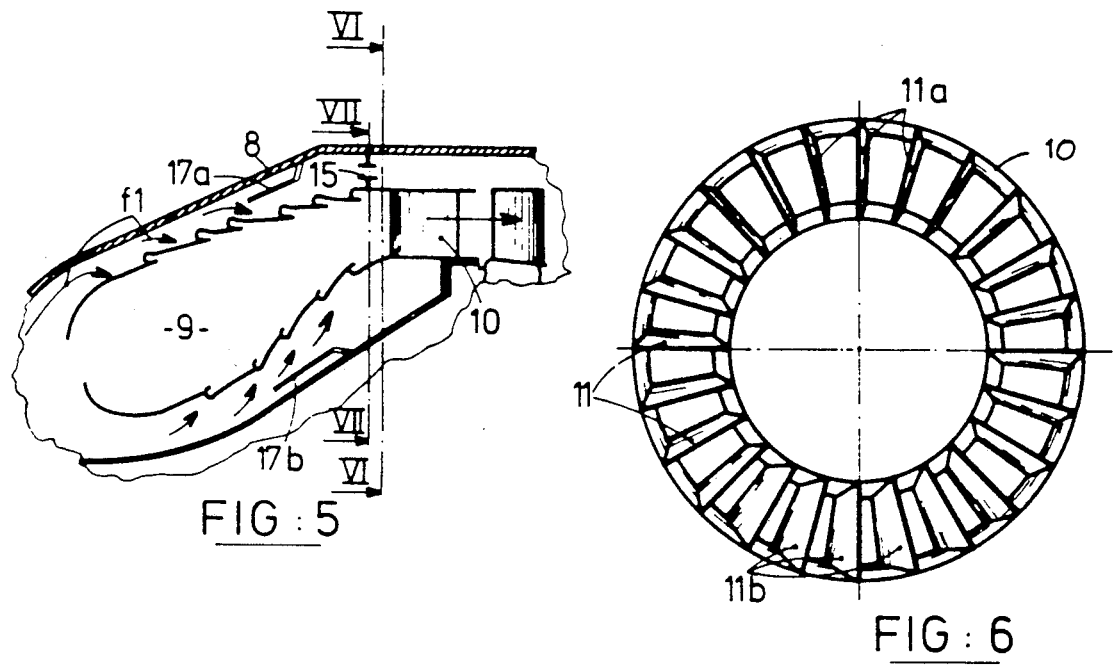
FIG:5
FIG:6
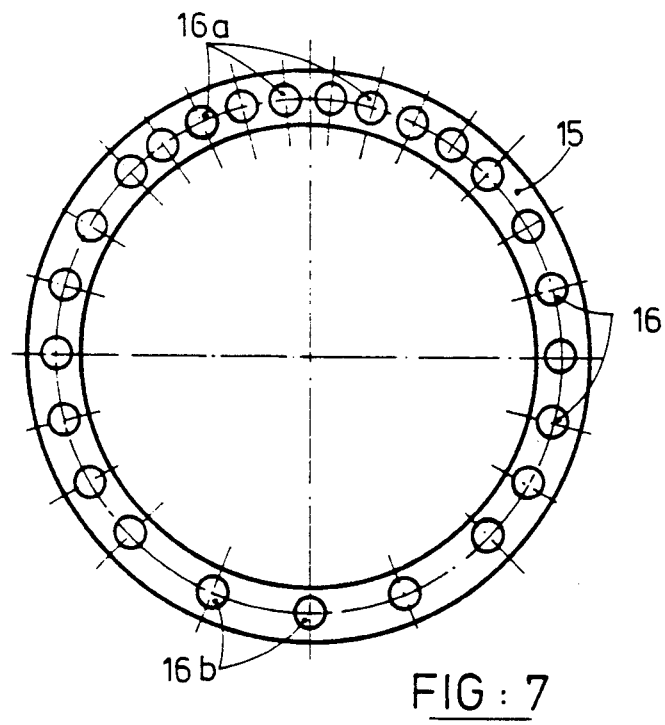
FIG:7

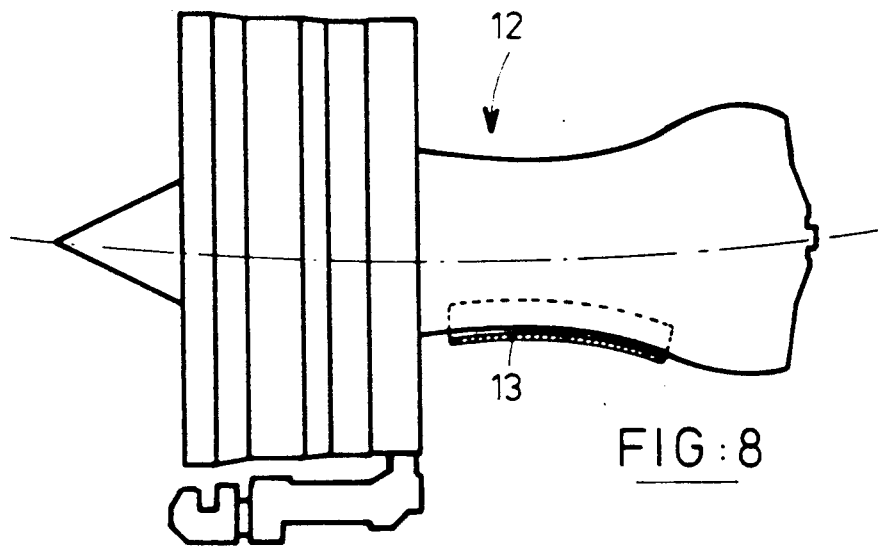
FIG:8
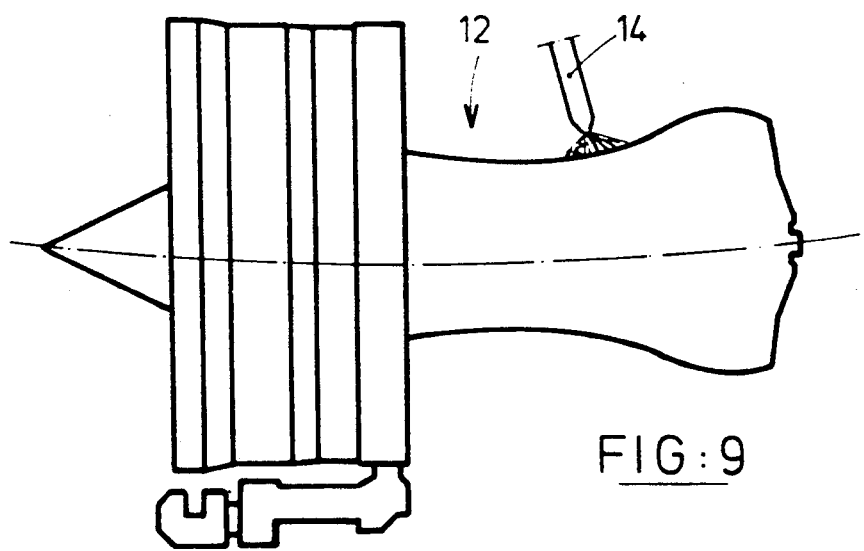
FIG:9

SYSTEM FOR DEFORMING A TURBINE STATOR HOUSING

BACKGROUND OF THE INVENTION

The present invention relates to a system for deforming a turbine stator housing, particularly such a system utilized in conjunction with a turbojet engine to maintain radial clearance between the stator and a rotor whose longitudinal axis may undergo radial deformation.

Studies conducted to improve the performance of turbojet engines have lead engine designers to find ways to optimize the radial clearances between the rotor and the stator of the turbojet engine. The maintenance of a minimum, but adequate, radial clearance between the rotor and the stator under all operating conditions directly effects the efficiency of the turbojet engine, the maximum thrust of the engine as well as minimizes the conditions under which the surging phenomena occurs.

Various proposals have been tried over the years to maintain this radial clearance under all engine operating conditions. The radial expansion of the turbine rotor, which is acted upon by extremely hot gases emanating from the turbojet engine combustion chamber, is effected by the temperatures of the rotor blades and the rotor wheel, as well as the speed of rotation of the rotor. The relative difference in the dimensions between the rotor blades and the rotor wheel causes these elements to expand at different rates. Thus, it can be seen that the radial clearance between the rotor and the stator is effected by the relative temperatures of these elements, as well as the rotational speed of the rotor, which varies throughout the operational envelope of the turbojet engine.

It is known to bleed air from one or more stages of the turbine compressor, or from the combustion chamber, and to direct this air onto the stator or rotors to adjust the temperature of these elements. The temperature of the air may be modulated by mixing the air from different sources, such as the turbine stage or the combustion chamber.

Typical examples of such systems can be found in U.S. Pat. Nos. 4,419,044; 4,304,093; and 4,230,439 as well as U.K. Patents 1,581,855 and 1,581,566. In these systems, the control of the bleed airflow regulators is based upon a sensor measurement of the magnitude of such items as temperature, rotational speed of the rotor, or a direct measurement of the radial clearance at any given instant. In some cases, a hydromechanical regulator controls the opening of the airflow regulating valves based upon a pre-established control program. While these systems have been theoretically feasible, as a practical matter, they have been found to be somewhat limited in maintaining the concentricity of the radial clearance between the rotor and the stator when an irregular distribution of the peripheral radial clearance exists.

Solutions have also been proposed to verify the correct centering between the rotor and the stator and to make corrections of the observed flaws. Typical examples of these solutions involving mechanical adjustment can be found in U.S. Pat. Nos. 4,222,708 and 4,548,546. Again, these solutions have proven to be inadequate for solving certain off-centering problems occurring during operation between the rotor and the stator wherein the excessive clearances between the rotor and the stator are unequally distributed about the peripheries. This has caused the reduction of the efficiency of the turbojet engine due to the disturbances caused in the aerodynamic gas flow by these peripheral distribution clearances.

The known systems have been found to be particularly deficient under certain operating conditions of the turbojet engine, particularly under transient conditions, in which the rotary and stationary parts of the turbojet engine may come into contact with each other on certain peripherally limited zones. Such contact causes excessive turbine blade wear which, in turn, creates excessive radial clearances, thereby reducing the efficiency of the turbojet engine. It has been found that this contact between the rotor and the stator on such peripherally limited zones is caused by radial deformation of the longitudinal axis of the rotor. As illustrated in FIG. 1, the radial displacement of the rotor axis R may be caused by worn bearings and/or the bending of the rotor shaft such that it assumes the bowed position illustrated in this figure. During such operation, the longitudinal axis of the stator S1 does not undergo corresponding deformation, thereby decreasing the radial clearance at a certain portion of the periphery and possibly causing contact between the elements at this portion.

It has been observed that, especially in aeronautical applications of the turbojet engine, that a more rapid cooling of the lower portion of the stator housing takes place during engine shutdown which results in a deformation of the longitudinal axis of the stator to assume the position S2 illustrated in FIG. 1. This stator housing deformation increases the possibility of contact between the rotor and the stator during this portion of the engine's operation.

SUMMARY OF THE INVENTION

A system for deforming a turbine stator housing is disclosed which maintains a substantially uniform radial clearance between a stator and a rotor under all operating conditions of a turbojet engine. The system deforms the turbine stator housing so that its longitudinal axis is substantially coincident with the longitudinal axis of the rotor, particularly under transient conditions. Such deformation results in the attainment of equal radial clearance between the rotor and the stator around the periphery of the rotor.

The deformation is achieved by changing the temperature of a selected portion of the stator housing such that the temperature distribution, measured around a periphery of the stator housing, is non-uniform, such non-uniform temperature distribution causing the stator to radially deform such that its longitudinal axis is coincident with that of the rotor.

The selected portion of the stator housing may be either cooled or heated to achieve the non-uniform temperature distribution. If the selected portion is to be cooled, it may be equipped with heat exchange baffles, or the turbine may be equipped with cooling gas distribution nozzles to direct a cooling gas onto the selected portion. Cooling airflow baffles or vanes may also be utilized to increase the flow of cooling air over the selected portion of the stator-housing.

Alternatively, the turbine stator housing may be deformed by heating the selected portion of the housing using methods similar to the cooling of the selected portion. A heating gas may be distributed onto the selected portion and/or thermal insulating devices may be used to accomplish this purpose. Also, devices external to the turbojet engine may be utilized to direct either cooling or heating gas onto the selected portion of the stator housing.

BRIEF DESCRIPTION OF THE DRAWINGS

FIG. 1 is a schematic, cross-sectional illustration of a stator housing illustrating the deformations of the rotor axis and the stator axis according to the prior art structures.

FIG. 2 is a schematic, cross-sectional diagram illustrating a stator housing deformed in accordance with the present invention.

FIGS. 3A and 3B are partial, schematic, cross-sectional views of the stator housing incorporating heat exchange baffles according to the present invention.

FIG. 4 is a partial, schematic, cross-sectional diagram illustrating devices for directing cooling or heating gases onto the stator housing.

FIG. 5 is a partial, cross-sectional view of a turbine engine combustion chamber incorporating screens according to the present invention to establish a non-uniform temperature in the stator housing.

FIG. 6 is a view taken in the direction of arrows VI—VI in FIG. 5 illustrating a cooling air distributing ring wherein the vanes are oriented to differentiate the flow of cooling air around the periphery of the stator housing.

FIG. 7 is a cross-sectional view taken along line VII—VII in FIG. 5 illustrating an air distribution ring according to the present invention.

FIG. 8 is a schematic side view illustration of a turbojet engine including a thermal insulation layer disposed on the selected portion of the stator housing.

FIG. 9 is a schematic side view of a turbojet engine illustrating external gas distribution devices to supply cooling or heating gases to the selected portion of the stator housing.

DETAILED DESCRIPTION OF THE PREFERRED EMBODIMENTS

FIG. 2 is a schematic, side view illustration of a turbine stator housing that has been deformed such that its longitudinal axis S conforms to the longitudinal axis R of a rotor (not shown) within the housing so as to maintain a substantially constant radial clearance around the periphery of the rotor. Unlike the known housing illustrated in FIG. 1, the stator housing in FIG. 2 has been deformed such that its longitudinal axis is curved downwardly.

Such radial deformation of the stator housing can be achieved when the temperature in the peripheral zone 1 of the stator, located on the concave side of the rotor axis is brought to a temperature T1 lower than the temperature T2 of the peripheral zone 2 located on the opposite side of the longitudinal axis. By establishing the proper relationship between temperatures T1 and T2, the longitudinal axis S of the stator can be made substantially coincident with the longitudinal axis R of the rotor.

By establishing such coincidence, the radial clearances can be made substantially equal around the periphery of the rotor to thereby avoid any possible contact between these elements during operation of the turbojet engine. This invention provides various ways of achieving this peripherally non-uniform temperature distribution around the periphery of the stator housing to cause the desired deformation.

A first example of such temperature distribution means is illustrated in FIGS. 3A and 3B. As can be seen, the stator housing 3 has mounted thereon a plurality of heat transfer baffles 4. The heat transfer baffles form obstacles in the path of a known cooling gas flow, illustrated by arrows f, to cause the cooling flow to maintain contact with the housing 3 for a longer period of time. The heat transfer baffles 4 also, in known fashion, provide greater cooling area to the cooling gas flow f to further increase the cooling of the portion of the stator housing on which the baffles are located. The heat transfer baffles 4 may extend radially outwardly from an external surface of the housing 3, as illustrated in FIG. 3A, or may extend generally radially inwardly from an interior surface of the housing 3, as illustrated in FIG. 3B. The heat transfer baffles 4 are located only on the selected zone or portion of the stator housing at which it is desired to cool. Such cooling will generally cause the side of the stator housing on which the select portion is located to become generally concave, as illustrated at 1 in FIG. 2. The heat transfer baffles 4 increase the cooling of the selected portion of the stator housing such that temperature T1 is less than T2 to achieve the deformation of the stator housing illustrated in FIG. 2.

FIG. 4 illustrates another embodiment for cooling the selected portion of the stator casing 3. This embodiment utilizes one or more cooling gas distributors 5 attached to known conduits 6. The cooling gas distributors 5 are located so as to direct a cooling gas onto the selected portion of the stator housing 3. A known valve-type flow regulator 7 may be incorporated into the cooling gas distribution means in known fashion to control the flow of the cooling gas onto the stator housing.

FIGS. 5-7 illustrate another way of achieving the non-uniform temperature distribution around the periphery of the stator housing. As can be seen in FIG. 5, the stator housing 8 of the turbojet engine surrounds a combustion chamber 9 which, in known fashion, generates hot gases which are directed by a distributor 10 onto a high pressure turbine rotor. The housing 8 is cooled by an airflow $f_1$ which flows along an inner wall of the housing 8 and which, in known fashion, may feed an air dilution chamber portion of the combustion chamber 9.

In accordance with the principals of this invention, the distributor 10 has a plurality of fixed vanes 11, as illustrated in FIG. 6, which are oriented to allow a greater air flow rate over the selected portion of the stator housing in order to increase the cooling of this portion. As seen in FIG. 6, the plurality of vanes 11a are oriented so as to permit a greater flow rate than are the vanes 11b. This orientation enables the distributor 10 to achieve a non-uniform temperature distribution around the periphery of the stator housing. The greater flow rate obtained in the zone of vanes 11a induces a greater rate of cooling in this zone.

The orientation of the distributor vanes also makes it possible to influence the temperature distribution of the combustion chamber and its heat radiation over the stator. This also contributes to the non-uniform temperature distribution over the periphery of the stator housing. The vanes located in the transition areas between vanes 11a and vanes 11b are oriented to provide a smooth transition of the temperature distribution around the stator housing. The principals described by FIGS. 5 and 6 for use with a high pressure turbine may also be used at other turbine locations depending upon the particular application.

Another means for influencing the non-uniform temperature distribution is illustrated in FIG. 7 and comprises a cooling air flow control ring 15 defining a plurality of air flow holes 16. As illustrated in FIG. 5, this ring may be inserted between the combustion chamber 9 and the housing 8 and will control a portion of the cooling flow $f_1$. The air flow control ring 15 establishes a portion through which a greater air flow rate is permitted such that a greater cooling air flow is applied to the selected portion of the stator housing. The differential flow rate may be obtained by spacing the adjacent air flow holes 16 closer together in the desired area than those in the remaining area. As illustrated in FIG. 7, the spacings between adjacent holes 16a are less than the spacing between adjacent holes 16b. Thus, the holes 16a permit a greater air flow rate than do the ring portions through which holes 16b extend. The holes 16a may also have a larger diameter than the holes 16b to further increase the cooling air flow in this portion. Screens 17a and 17b may also be placed on the combustion chamber walls to attenuate the radiation of the heat from the combustion chamber onto the corresponding parts of the stator housing 8. The presence of such screens limits the radiating heat applied to the selected portion of the stator housing, thereby contributing to the non-uniform temperature distribution about the stator housing.

Depending upon the installation of the turbojet engine, means outside the engine may be used to heat or cool the stator housing. In FIG. 8, a thermal insulation layer 13 has been applied to the exterior surface of the stator housing of the turbojet engine 12. The thermal insulation layer 13 increases the temperature of the stator housing at the selected location of the thermal insulation layer to achieve the non-uniform temperature distribution. Thermal insulation layer 13 also makes it possible to delay the cooling of the protected zones during turbojet engine shutdown.

As illustrated in FIG. 9, externally located cooling or heating gas distributors 14 may be utilized to achieve the non-uniform temperature distribution around the turbine stator housing of the turbojet engine 12. Although only one such gas distribution means 14 is illustrated, it is to be understood that, depending upon the specific application, several such distributors may be located longitudinally distributed along the stator housing.

Quite obviously, if the distributors 14 are utilized to supply a heated gas to the stator housing, they will be located on a side opposite from those distributors which supply a cooling gas to the housing. The systems and devices for deforming the turbine stator housing just described also enable the control of the positions of the parts and the components installed on the stator housing, such as ejection pipes and air intakes.

The foregoing description is provided for illustrative purposes only and should not be construed as in any way limiting this invention, the scope of which is defined solely by the appended claims.

I claim:

1. Apparatus for maintaining a substantially uniform radial clearance between a stator housing and a rotor of a turbine as a longitudinal axis of the rotor undergoes radial deformation comprising means to change the temperature of a selected portion on one side of the stator housing such that the temperature of the selected portion is different from the temperature of a generally opposite side of the stator housing, whereby the temperature distribution measured around a periphery of the stator housing is non-uniform, such non-uniform temperature distribution causing the stator to radially deform such that a longitudinal axis of the stator housing is generally coincident with the longitudinal axis of the rotor.

2. The apparatus of claim 1 wherein the means to change the temperature comprises cooling means to lower the temperature of the selected portion of the stator housing, thereby causing an external surface of the stator housing to be generally concave at the selected portion.

3. The apparatus of claim 2 wherein the means for lowering the temperature of the selected portion comprises heat transfer baffles extending generally radially from the stator housing.

4. The apparatus of claim 3 wherein the heat transfer baffles extend generally radially outwardly from an exterior surface of the stator housing.

5. The apparatus of claim 3 wherein the heat transfer baffles extend generally radially inwardly from an interior surface of the stator housing.

6. The apparatus of claim 2 wherein the means to change the temperature comprises cooling gas distributing means to distribute a cooling gas onto the selected portion of the stator housing.

7. The apparatus of claim 6 further comprising regulating means operatively associated with the cooling gas distribution means to regulate the amount of cooling gas distributed on the selected portion of the stator housing.

8. The apparatus of claim 2 further comprising cooling air distributing vanes located within the stator housing, the air distributing vanes oriented to provide a greater cooling air flow rate over the selected portion of the stator housing.

9. The apparatus of claim 2 further comprising a cooling air flow control ring located in the stator housing, the ring defining a plurality of air flow holes to allow cooling air to pass through the ring, wherein the spacing between adjacent holes at the selected portion of the stator housing is less than the spacing between adjacent holes not located at the selected portion of the stator housing.

10. The apparatus of claim 2 further comprising a cooling air flow control ring located in the stator housing, the ring defining a plurality of air flow holes to allow cooling air to pass through the ring, wherein the dimensions of the holes located adjacent to the selected portion of the stator housing are greater than the dimensions of the holes not located adjacent to the selected portion of the stator housing.

11. The apparatus of claim 1 wherein the turbine includes a combustion chamber and wherein the non-uniform temperature distribution is achieved by at least one thermally insulating screen located within the combustion chamber adjacent to the selected portion of the stator housing.

12. The apparatus of claim 1 wherein the means to change the temperature of the selected portion of the stator housing comprises thermal insulating means operatively associated with the selected portion of the stator housing.

13. The apparatus of claim 1 wherein the means to change the temperature comprises heating means to raise the temperature of the selected portion of the stator housing.

14. The apparatus of claim 13 wherein the heating means comprises heating gas distributing means to distribute a heating gas onto the selected portion of the stator housing.

15. The apparatus of claim 14 further comprising regulating means operatively associated with the heating gas distributing means to regulate the amount of heating gas distributed on the selected portion of the stator housing.

* * * * *